United States Patent
Smiljanich et al.

(10) Patent No.: US 8,835,079 B2
(45) Date of Patent: Sep. 16, 2014

(54) FUEL CELL SEPARATOR PLATE SURFACE TREATMENT BY LASER ABLATION

(75) Inventors: David A Smiljanich, Sylvama, OH (US); Reena L. Datta, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 2357 days.

(21) Appl. No.: 11/760,183

(22) Filed: Jun. 8, 2007

(65) Prior Publication Data

US 2008/0305385 A1   Dec. 11, 2008

(51) Int. Cl.
*H01M 8/00* (2006.01)
*H01M 8/02* (2006.01)

(52) U.S. Cl.
CPC .......... *H01M 8/0247* (2013.01); *H01M 8/0228* (2013.01); *H01M 8/0206* (2013.01); *H01M 8/0215* (2013.01); *Y02E 60/50* (2013.01)
USPC ........................................ 429/535

(58) Field of Classification Search
USPC .................................. 429/400–535
See application file for complete search history.

(56) References Cited

U.S. PATENT DOCUMENTS

| 6,051,331 A * | 4/2000 | Spear et al. | 429/413 |
| 2003/0003345 A1 * | 1/2003 | Ohara et al. | 429/38 |
| 2003/0118888 A1 * | 6/2003 | Allen | 429/34 |
| 2007/0235902 A1 * | 10/2007 | Fleming et al. | 264/400 |
| 2007/0254204 A1 * | 11/2007 | Shin et al. | 429/38 |

* cited by examiner

*Primary Examiner* — Muhammad Siddiquee
(74) *Attorney, Agent, or Firm* — Quinn Law Group, PLLC

(57) ABSTRACT

A composite separator plate for use in an electrochemical fuel cell as well as a method of forming same is disclosed. The plate may be formed of polymeric material and electrically conductive material having a non-conductive polymeric outer layer by compression molding, or alternately of a metallic material having an outer metal oxide layer. Contact regions of the plate surface are subsequently ablated with a laser to remove the outer layer of material from the plate. The removal of the outer layer reduces the contact resistance of the plate when used in an electrochemical fuel cell stack, while offering adequate strength and corrosion resistance for the fuel cell stack environment.

10 Claims, 7 Drawing Sheets

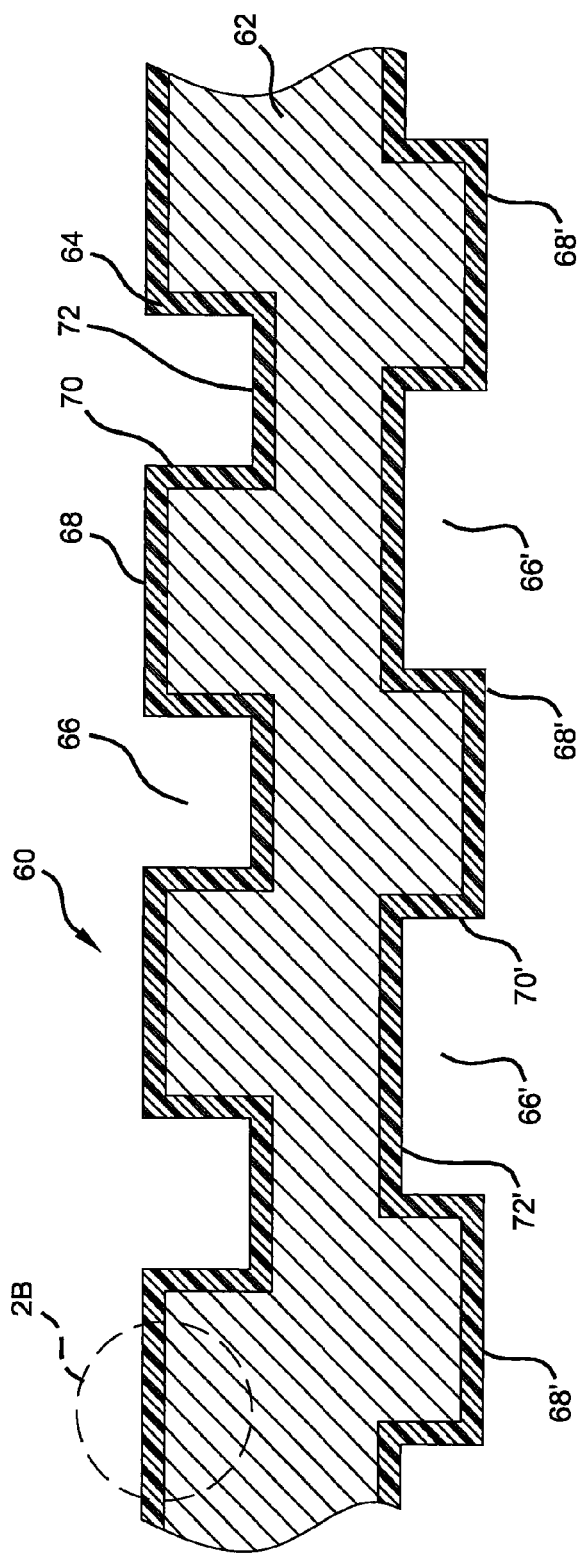
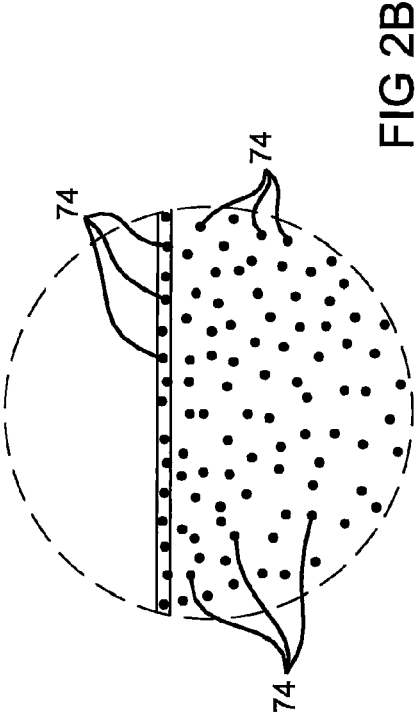
FIG 2A
FIG 2B

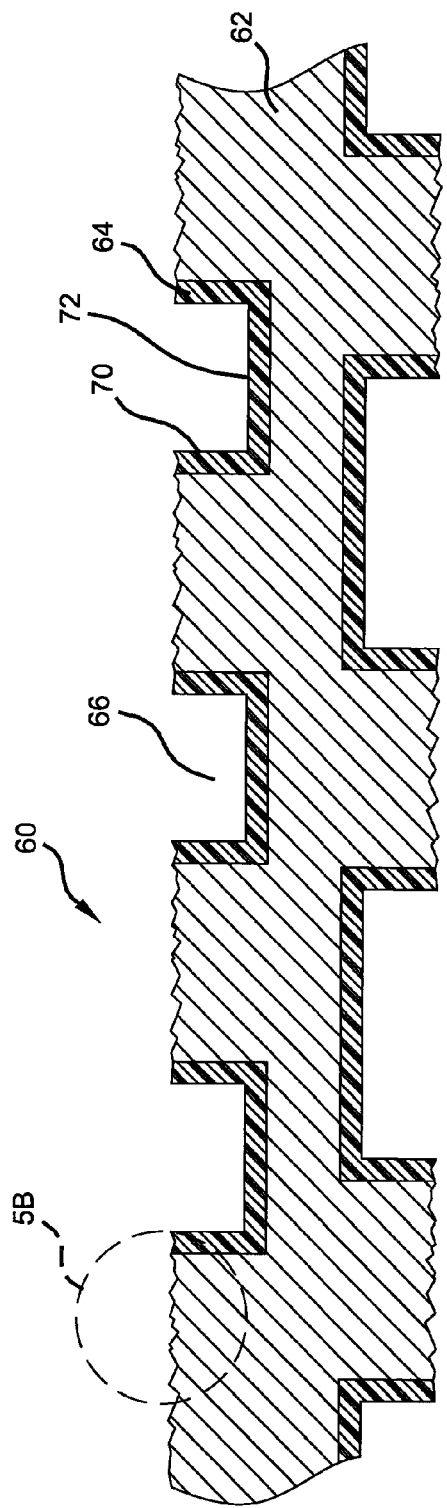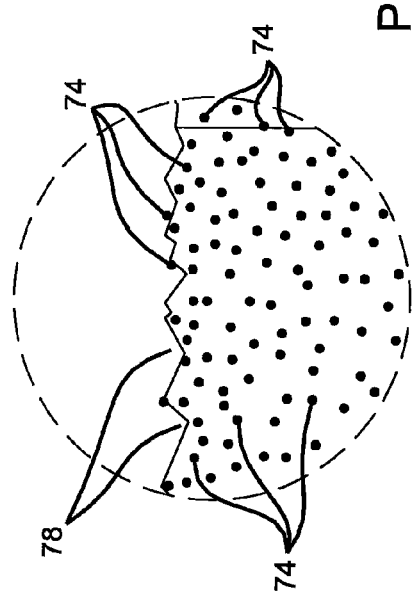

FUEL CELL SEPARATOR PLATE SURFACE TREATMENT BY LASER ABLATION

FIELD OF THE INVENTION

The present invention relates to Proton Exchange Membrane (PEM) fuel cells, and, more particularly, to polymeric separator plates and a method for making the same.

BACKGROUND OF THE INVENTION

Fuel cells have been proposed as a power source of the future for automobiles and other industrial applications. One known fuel cell design is the PEM fuel cell that includes a "membrane-electrode assembly" comprising a thin, solid polymer membrane-electrolyte having an anode on one face of the membrane-electrolyte and a cathode on the opposite face of the membrane-electrolyte. The anode and cathode typically comprise finely divided carbon particles, having very finely divided catalytic particles supported on the internal and external surfaces of the carbon particles, and proton conductive material intermingled with the catalytic and carbon particles.

The membrane-electrode assembly is sandwiched between a pair of electrically conductive contact elements which serve as current collectors for the anode and cathode, and may contain appropriate flow channels and openings therein for distributing the fuel cell's gaseous reactants (i.e., $H_2$ & $O_2$/air) over the surfaces of the respective anode and cathode.

A bipolar PEM fuel cell includes a plurality of the membrane-electrode-assemblies stacked together in electrical series while being separated one from the next by an impermeable, electrically conductive contact element known as a bipolar or separator plate or septum. The separator or bipolar plate has two working faces, one confronting the anode of one cell and the other confronting the cathode on the next adjacent cell in the stack, and each bipolar plate electrically conducts current between the adjacent cells. Contact elements at the ends of the stack are referred to as end, terminal, or collector plates. These terminal collectors contact a conductive element sandwiched between the terminal bipolar plate and the terminal collector plate.

There are competing interests in the design of these separator plates, and thus it is common for separator plates to be formed with different attributes reflective of the various design considerations. For example, it is desirable to maintain a low contact resistance at the interface of the separator plates to promote electrical conductivity, and thus greater efficiency of the fuel cell stack and more stable operation at low power conditions. For this reason it is important that at least a portion of the separator plate have electrically conductive characteristics. It is also important to produce a separator plate that is strong enough to withstand the pressure typically exerted upon the fuel cell stack during operation, as well as any handling during transit or assembly of the stack. Additionally it is important for the separator plate to resist corrosion, as the fuel cell stack environment generally can promote corrosion in certain materials. For these reasons it is known in the art to use either a composite plate having a polymeric base material which is relatively strong, ductile, and resistant to corrosion, blended with carbon particles or other electrically conductive elements which decrease the contact resistance of the separator plate or a metal substrate with a conductive, corrosion resistant coating.

For composite separator plates a lower polymeric content is desired to maximize the electrical conductivity of the plate. However, this generally results in a brittle separator plate prone to breaking during operation or handling of the fuel cell. A higher polymeric content may be used to maintain adequate plate ductility and resilience. Still, the compression molding process commonly used to form separator plates tends to cause the formation of a thin layer of polymeric resin on the outside of the formed plate. During the forming process the polymeric material tends to accumulate near the mold, around the outside surface of the separator plate. This thin, outer layer of polymeric resin material is low in electrical conductivity, and therefore tends to further increase the contact resistance of the separator plate.

This thin, outer layer of resin material of the polymeric separator plate may be removed by grinding, sanding, machining or some other mechanical means prior to installation of the separator plates in the fuel cell stack. There are still disadvantages to removing this outer layer of material through mechanical processes. These processes are relatively harsh operations for such delicate plates, and can easily result in breakage of the plates which are subjected to them. Even when performed properly, these operations tend to leave the plate with grooves or scratches and compromise the integrity of the conductive carbon particles that are left on the resulting surface. These carbon particles, which are important to maintaining the electrical conductivity of the plate, will tend to become loose and rub off of the plate as a result of grinding or sanding, leaving small voids on the surface of the plate. The scratches, grooves, and voids effectively reduce the electrical conductivity of the plate, and thus decrease the overall efficiency of the fuel cell stack. Alternately, the carbon particles may become depressed below the contact surface of the plate.

For metal separator plates, an oxide coating or layer can be formed on the surface to reduce the composite effects on the plate structure. However, this oxide layer tends to increase the contact resistance of the plate. Additionally, certain coatings which have hydrophilic properties can be used to improve stability at a wide range of operating conditions; however, these types of coatings usually increase the contact resistance of the plate.

Accordingly, there exists a need in the relevant art to provide a separator plate and method of manufacture that is capable of maintaining a high degree of strength while minimizing contact resistance. Additionally, there is a need in the relevant art to provide a separator plate and method of manufacture that overcomes the disadvantages of the prior art.

SUMMARY OF THE INVENTION

The present invention provides a method for forming a separator plate with a protective outer layer and using laser ablation to selectively remove the outer layer for reducing the contact resistance of the plate in those areas while possessing the beneficial properties of the protective outer layer in other areas of the plate. The separator plate can thus be manufactured with a polymeric material content sufficient to maintain proper strength and corrosion resistance of the plate, while the use of laser ablation improves electrical conductivity as compared with the prior art methods of producing these separator plates. Alternatively, the plate can be fabricated from a metal having an outer oxide layer. The laser ablation process also leaves a relatively smooth surface on the metal separator plate free of the defects typical of grinding or sanding.

In another aspect, the present invention provides a composite separator plate having at least one polymeric material and at least one electrically conductive material for use in a fuel cell stack. A flow field with a plurality of flow channels and a smooth outer surface with an ablated region is formed in the separator plate.

In another aspect, the present invention provides a metal separator plate having an outer coating or layer formed thereon. A flow field defined by one or more grooves or channels is formed in a major face of the separator plate. Areas of the major face adjacent the flow field are laser ablated to locally remove the outer coating.

In yet another aspect, the present invention contemplates a separator plate and fabrication method in which the junctions within a coolant volume of a bipolar plate are laser ablated to locally remove an outer layer or coating.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2A is a section view of an exemplary separator plate showing a preferred embodiment of the present invention after forming the separator plate, but before laser ablation;

FIG. 2B is a close-up view of a portion of the section view of FIG. 2A;

FIG. 5A is a section view of a separator plate representing the prior art;

FIG. 5B is a close-up view of a portion of the section view of FIG. 5A;

DETAILED DESCRIPTION OF THE PREFERRED EMBODIMENT

The following description of the preferred embodiment is merely exemplary in nature and is in no way intended to limit the invention, its application, or uses.

A method of forming a composite separator plate for use in an electrochemical fuel cell stack is provided in which the plate is formed by compression molding, or any of a variety of alternative methods known in the art, and then using laser ablation to remove a thin outer layer from the plate. The composite separator plate has a body including at least one polymeric material and at least one electrically conductive material. A series of flow channels are formed in a generally smooth surface with conductive particles intact at the surface of anode and cathode composite molded halves that are then bonded together by using a conductive adhesive at the coolant interface to form a bipolar plate. Alternatively, the plate is formed by a metal forming operation and a subsequent optional coating operation. The anode and cathode metal formed halves are joined through bonding, brazing, welding, or similar processing to form a bipolar plate.

Figure 1A:
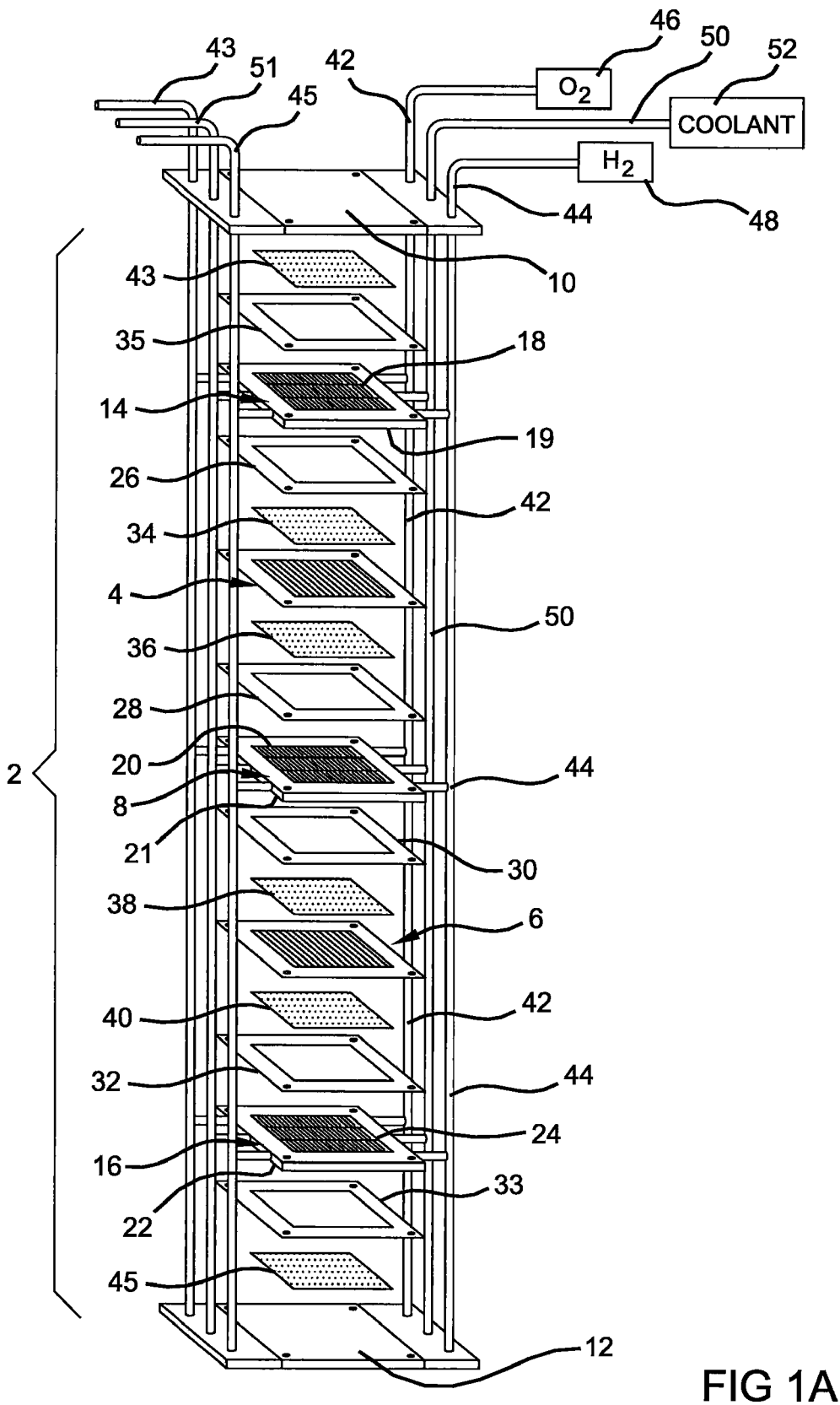
FIG. 1A is a schematic illustration of two cells in a liquid-cooled PEM fuel cell stack.
Figure 1B:
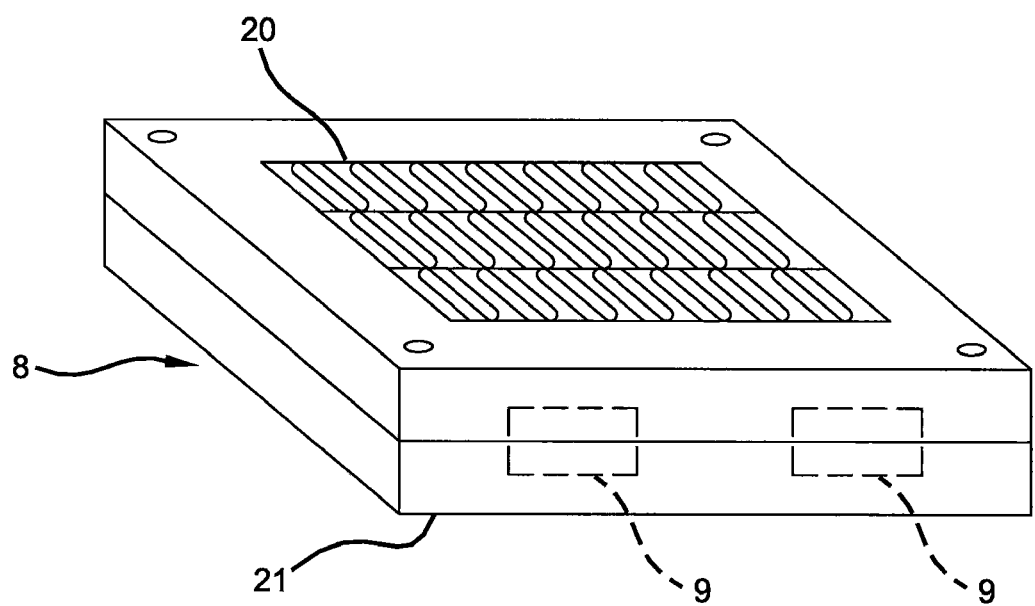
FIG. 1B is a partial view of the separator plate shown in FIG. 1A.

FIG. 1A depicts two individual proton exchange membrane (PEM) fuel cells connected to form a stack 2 having a pair of membrane-electrode-assemblies (MEAs) 4 and 6 separated from each other by an electrically conductive, liquid-cooled, bipolar separator plate 8. In a stack 2, a preferred bipolar separator plate 8 typically has two electrically active sides 20, 21 within the stack, each active side 20, 21 respectively facing a separate MEA 4, 6 with opposite charges that are separated, hence the so-called "bipolar" plate. In constructing bipolar plate 8, it is common to conductively join a pair of plates together, e.g., weld, braze, bond with conductive adhesive, so as to provide a coolant volume 9 between the plates as seen in FIG. 1B. As described herein, the fuel cell stack 2 is described as having conductive bipolar plates; however the present invention is equally applicable to separator plates having only a single fuel cell.

The MEAs 4, 6 and bipolar plate 8, are stacked together between clamping terminal plates 10 and 12, and end contact fluid distribution separator plates 14 and 16. The end separator plates 14, 16, as well as both working faces of the bipolar plate 8, contain a plurality of lands adjacent to grooves or channels on the active faces 18, 19, 20, 21, 22, and 24 for distributing fuel and oxidant gases (i.e., $H_2$ & $O_2$) to the MEAs 4, 6. Nonconductive gaskets or seals 26, 28, 30, 32, 33, and 35 provide seals and electrical insulation between the several components of the fuel cell stack. Gas-permeable conductive diffusion media 34, 36, 38, and 40 press up against the electrode faces of the MEAs 4, 6. Additional layers of conductive media 43, 45 are placed between the end contact fluid distribution plates 14, 16 and the terminal collector plates 10, 12 to provide a conductive pathway therebetween when the stack is compressed during normal operating conditions. The end contact separator plates 14, 16 press up against the diffusion media 34, 40 respectively, while the bipolar separator plate 8 presses up against the diffusion media 36 on the anode face of the MEA 4, and against diffusion media 38 on the cathode face of MEA 6.

Oxygen is supplied to the cathode side of the fuel cell stack from storage tank 46 via appropriate supply plumbing 42, while hydrogen is supplied to the anode side of the fuel cell from storage tank 48, via appropriate supply plumbing 44. Alternatively, air may be supplied to the cathode side from the ambient, and hydrogen to the anode from a methanol or gasoline reformer, or the like. Exhaust plumbing 43, 45 for both the anode and cathode sides of the MEAs are also provided. Additional plumbing 50 is provided for circulating coolant from a storage tank 52 through the bipolar separator plate 8 and end separator plates 14, 16 and out the exit plumbing 51. Hereinafter, the term "separator plate" refers to either a bipolar plate or an end contact separator plate. A separator plate may also be generally referred to as defining the entire assembly of two independent separator plates (with a space in between them respectively for coolant flow) or the single independent separator plate itself.

Selection of a suitable material of construction for the separator plates contemplates such parameters as overall density (mass and volume); durability, flexibility, strength, and toughness for handling; electrical resistance; and corrosion and oxidation resistance within the fuel cell environment. Thus, some of the important considerations for a separator plate material include electrical conductivity, corrosion resistance, and strength to withstand the overall stresses that may be placed upon the separator plate during fabrication, handling, assembly, and use of the fuel cell stack. The electrical conductivity of the polymeric separator plate is typically compromised to some extent by the need for increased strength and ductility of the separator plate, and the need for the separator plate to withstand the corrosive conditions during use of the fuel cell stack.

As strength and corrosion resistance are advantages of polymeric materials in these applications, it is common that a polymeric material constitutes at least a portion of the material content of the separator plate. Polymeric materials, however, generally possess non-ideal electrical conductivity properties. This negative quality can be particularly evident on the outer surface and face of the separator plate, where a polymer layer will form during molding of the separator plate.

As strength and electrical conductivity are advantages of metals, such as stainless steel, in this application, it is also common to employ these materials in the fabrication of separator plates. Such metals often do not provide the necessary corrosion resistance. As a result, an oxide layer is formed or deposited on the surface which enhance the corrosion resistance but adversely increases the contact resistance.

In accordance with the present invention, the outer layer of polymeric material or metal oxide is removed from the separator plate using laser ablation, which results in a smoother resultant surface on the separator plate, and generally leaves the electrically conductive particles undisturbed. The contact resistance of the separator plate is consequently reduced, increasing the overall efficiency of the fuel cell stack as compared with those using machined separator plates or untreated separator plates.

Figure 4:
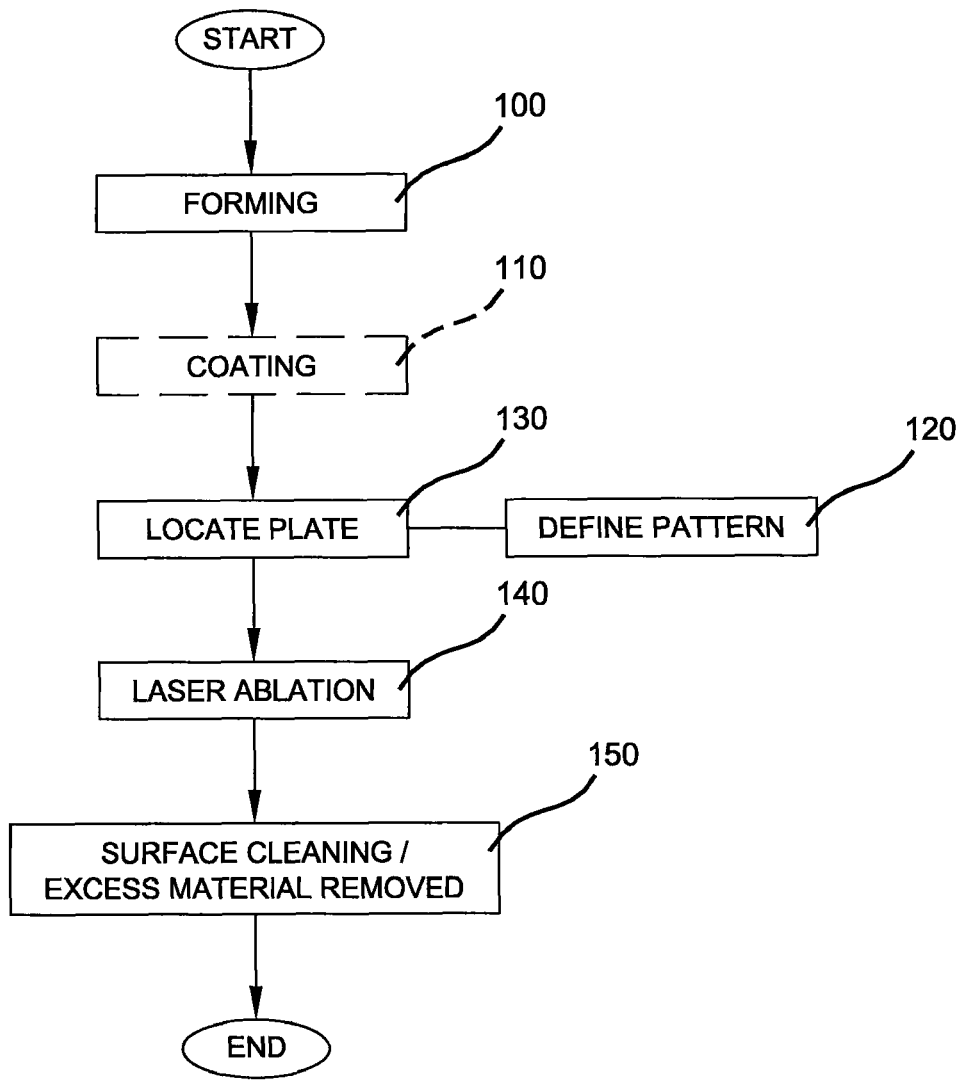
FIG. 4 is a diagram of the manufacturing process used to produce a composite separator plate according to the principles of the present invention.

A general manufacturing process of a composite separator plate in accordance with the principles of the present invention is shown in FIG. 4. The plate is first formed by compression molding, at block 100. This forming process will generally leave the separator plate with a resin-like layer of polymeric material on the outer surface of the separator plate as discussed above. The outer layer 64 may include an optional hydrophilic coating deposited on the separator plate at block 110. A material removal pattern is next defined at block 120 for removing this outer layer from the separator plate by laser ablation. The separator plate is fixed in a predetermined locator as defined at block 130. Next, at block 140, laser ablation is used to remove the outer layer (with optional coating) from the separator plate according to the removal pattern defined at block 120. After this step it may be necessary to clean or otherwise remove the ablated material from the separator plate through forced air or a suitable solvent wash at block 150. The separator plate is then ready for assembly as part of the fuel cell stack.

A separator plate 60 is shown in FIG. 2A after being formed in a compression mold and optionally coated with a hydrophilic coating. Separator plate 60 has channels 66, 66' through which the reactant gases and coolant respectively flow during operation of the fuel cell stack and a major surface 68, 68' adjacent to the channels 66, 66'. Separator plate 60 is composed of a polymeric base material and electrically conductive particles 74 distributed throughout the plate (FIG. 2B). The plate has an inner core 62 and an outer layer 64. The ratio of the polymeric material to electrically conductive particles in outer layer 64 is relatively higher than the ratio in inner core 62 due to the nature of the forming processes used to produce separator plate 60. Furthermore, any hydrophilic coating deposited on the plate resides on outer layer 64. Outer layer 64 is generally formed across the entire outer surface of separator plate 60, including the major surface 68, 68', and the sides 70, 70' and bottom 72, 72' of flow channels 66, 66'.

As discussed herein, outer layer 64 is machined off of separator plate 60 under conventional processing with the resulting separator plate 60 illustrated in FIGS. 5A and 5B.

Figure 3A:
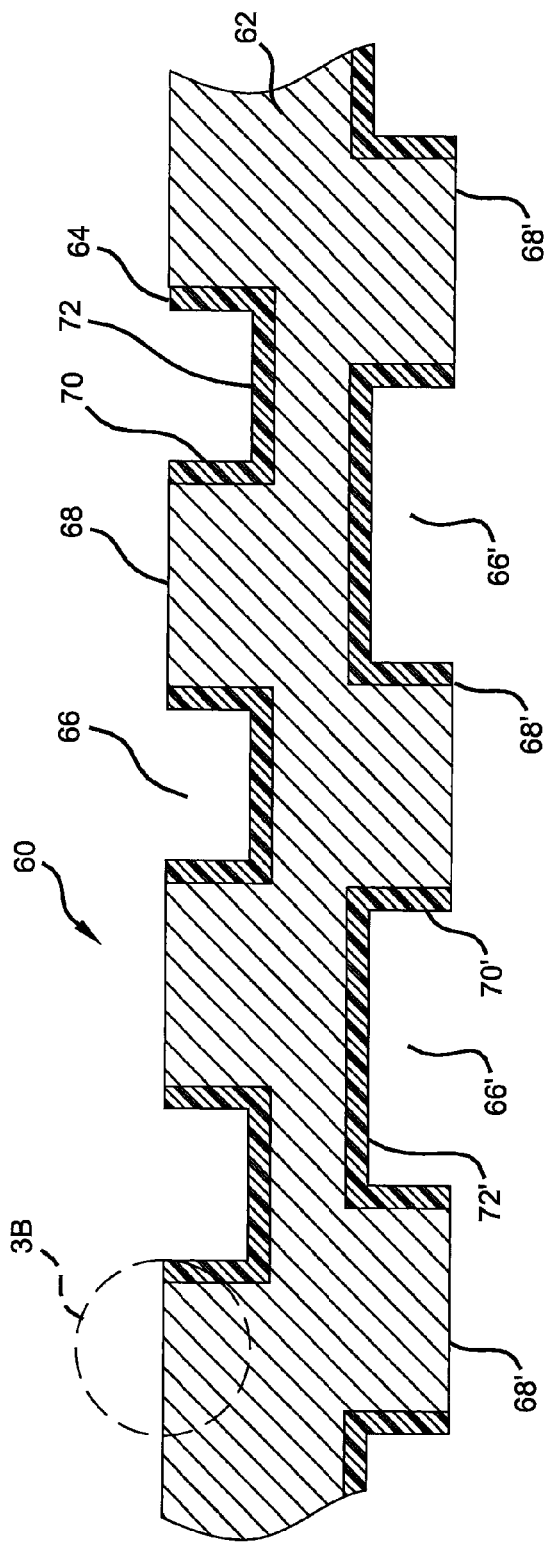
FIG. 3A is a section view of an exemplary separator plate showing a preferred embodiment of the present invention after the plate is subjected to laser ablation.
Figure 3B:
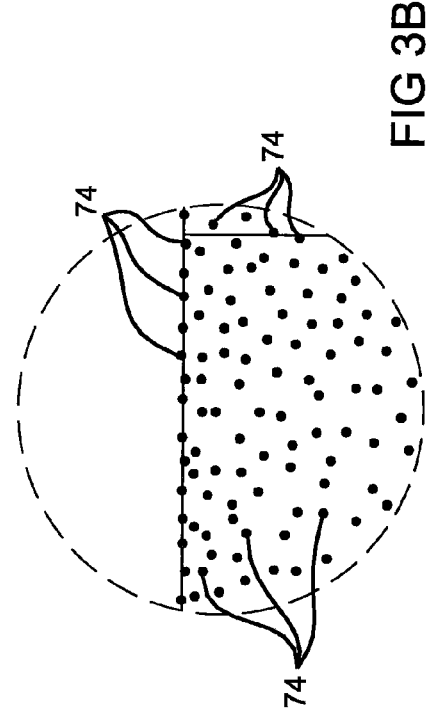
FIG. 3B is a close-up view of a portion of the section view of FIG. 3A.

Alternately, a separator plate 60 as shown in FIGS. 3A and 3B undergoes laser ablation to remove outer layer 64. A typical laser used for this operation is a Process Photonics GSI Lumonics laser, which can be controlled through an interface with a desktop computer. The plate 60 is located adjacent to the laser and subjected to a series of bursts from the laser as it moves along upper surface 68 according to the pattern desired by the user. In a presently practiced process, the laser is operated at an energy density range of 7.0 Joules/$cm^2$–10.0 Joules/$cm^2$, with a beam size of 1.0 mm×1.0 mm, and a step size in the X and Y directions along the surface of the plate ranging from 0.2 mm to 0.5 mm. The pulse width of the laser is modulated at a rate to achieve between five to fifty laser pulses per point for sufficiently ablating outer layer 64 from separator plate 60. Experimentation has shown that these operating conditions work but other conditions can be used and other operating conditions may be better suited for a particular manufacturing processing.

After laser ablation outer layer 64 has been eliminated leaving major surface 68, 68' relatively smooth with conductive particles 74 intact on major surface 68, 68' as shown in FIG. 3B. It should be noted that although laser ablation is only shown here along major surface 68, 68', it may be used to remove material from virtually any surface of separator plate 60. Thus, outer layer 64 may be removed from anywhere along major surface 68, 68', or sides 70, 70' and bottom 72, 72' of channels 66, 66'. Since sides 70, 70' and bottom 72, 72' of channels 66, 66' do not generally affect the contact resistance of separator plate 60, certain benefits may be achieved by defining a laser pattern which leaves the outer layer intact in these regions. Such benefits include providing enhanced corrosion resistance as well as process cost and time reductions. It may also prove beneficial to ablate outer layer 64 from major surface 68, 68' only where contact resistance is most affected by the presence of outer layer 64 in order to save time and minimize production costs. In sum, any area of major surface 68, 68' may be ablated to better customize the separator plate for the performance needs of the fuel cell stack.

The process of laser-ablating a region of the major surface of the separator plate has shown to provide significantly improved characteristics for use of the separator plate in a fuel cell as can be observed from the data set forth in the table below.

| Comp (psi) | Voltage Drop (mV) | | | Contact Resistance (m$\Omega \cdot cm^2$) | | |
|---|---|---|---|---|---|---|
| | As Molded | Machined | Laser Ablated | As Molded | Machined | Laser Ablated |
| 50 | 48.7 | 26.1 | 25.3 | 60.9 | 32.7 | 31.6 |
| 75 | 35.9 | 20.7 | 19.4 | 44.9 | 25.9 | 24.3 |
| 100 | 29.9 | 18.0 | 16.3 | 37.4 | 22.5 | 20.4 |
| 200 | 19.4 | 13.6 | 11.3 | 24.2 | 17.0 | 14.1 |
| 300 | 15.7 | 12.0 | 9.4 | 19.7 | 15.0 | 11.8 |
| 400 | 13.9 | 11.2 | 8.4 | 17.4 | 14.0 | 10.5 |

Figure 6:
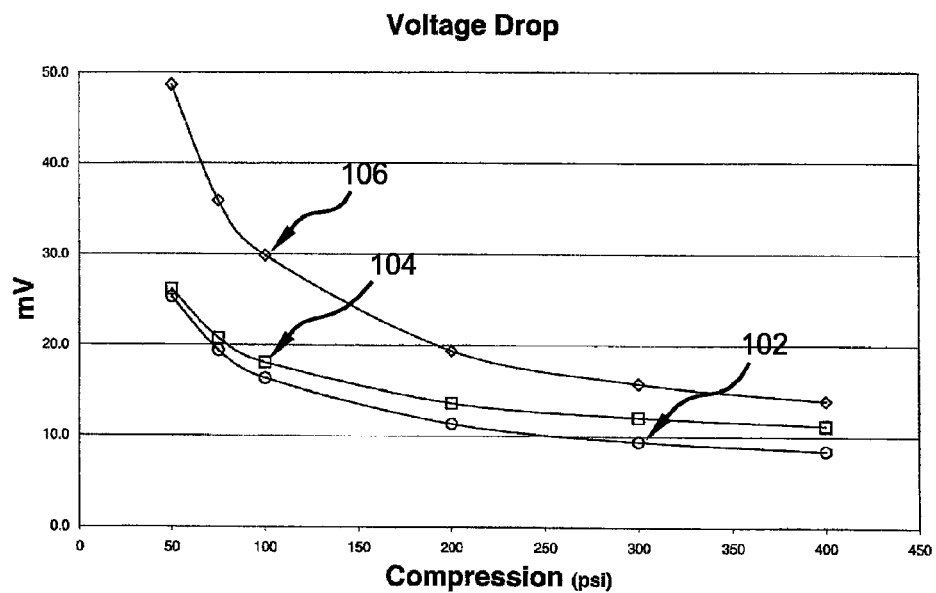
FIG. 6 is a graph comparing the voltage drop across a separator plate in the as-molded form, machined, and laser ablated for a range of compression pressures.
Figure 7:
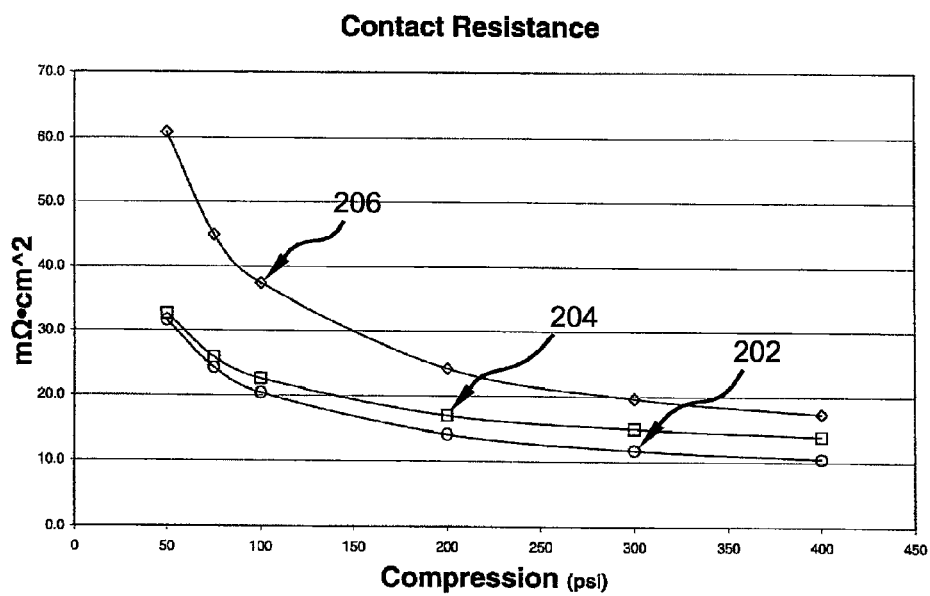
FIG. 7 is a graph comparing the contact resistance of a separator plate in the as-molded form, machined, and laser ablated for a range of compression pressures.

As shown in FIG. 6, the voltage drop across the separator plate at the ablated region (represented by line 102) is significantly less than the voltage drop of a similar plate in an as-molded condition (represented by line 106) and is slightly less than the voltage drop across of a similar plate having a machined surface (represented by line 104). Likewise, as shown in FIG. 7, the contact resistance at the ablated region of the major face (represented by line 202) is significantly less than the contact resistance of a similar plate in an as-molded condition (represented by line 206) and is slightly less than the contact resistance of a similar plate having a machined surface (represented by line 204).

Furthermore, SEM analysis of the laser-ablated surface revealed a contact surface in which portions of the graphite particles have become clearly exposed as compared with the contact surface found with the as-molded and machined samples. A roughness measurement at the laser-ablated region further confirmed the highly-textured nature of the laser ablated surface. EDS analysis of the separator plates indicated that the laser ablated plate had the lowest oxygen content at the contact surface followed by the machined plate and then the as-molded plate with significantly higher oxygen content. Oxygen content directly correlated to resin content. When measuring the static contact angle on a surface of an exemplary laser ablated plate, a non-hydrophilic surface (i.e., contact angle >, 90°) was observed. However, may also be used to provide a micro-texture on the surface of the plate to change the hydrophallicity thereof. And as already stated, laser ablation can be used to selectively remove coatings from the base substrate.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of manufacturing a separator plate for a fuel cell comprising:
   forming a separator plate of a material, wherein the separator plate material is one that forms on a major face of said separator plate an outer layer having lower electrical conductivity as to an inner core of said separator plate;
   optionally, depositing a hydrophilic coating on said outer layer;
   defining a pattern associated with a major face of said separator plate; and
   ablating with a laser beam at least a portion of said outer layer from said major face according to said pattern to form a finished separator plate.

2. The method of claim 1 comprising compression molding a composite material to form said separator plate.

3. The method of claim 1 comprising forming said separator plate of a polymeric material and at least one electrically conductive component, such that said outer layer of said separator plate has a relatively higher polymeric material content than the inner core of said composite plate.

4. The method of claim 3 comprising selectively ablating said portion to expose particles of said electrically conductive component on said major face.

5. The method of claim 1 comprising:
   forming the separator plate blank from a metal sheet wherein said major face has an oxide layer.

6. The method of claim 1 comprising:
   depositing the hydrophilic coating on said outer layer.

7. The method of claim 1 wherein said laser is operated at an energy density range of between about 7 and 10 Joules/cm$^2$ with a beam size of approximately 1 mm$^2$.

8. The method of claim 7 wherein said laser is moved relative to said surface of said separator plate in a step size ranging form about 0.2 mm of 0.5 mm.

9. The method of claim 8 wherein said laser is modulated at a pulse width rate to achieve between five to fifty laser pulses per point.

10. The method of claim 1 wherein said pattern coincides with said outer surface of said separator plate, such that said outer layer remains within a fluid flow channel formed in the major face of said separator plate.

* * * * *